US008722203B2

(12) United States Patent
Laurent et al.

(10) Patent No.: US 8,722,203 B2
(45) Date of Patent: May 13, 2014

(54) STEEL, FOR HOT FORMING OR QUENCHING IN A TOOL, HAVING IMPROVED DUCTILITY

(75) Inventors: Jean-Pierre Laurent, Istres (FR); Thierry Malot, Arles (FR)

(73) Assignee: ArcelorMittal France, Saint Denis (FR)

( * ) Notice: Subject to any disclaimer, the term of this patent is extended or adjusted under 35 U.S.C. 154(b) by 0 days.

(21) Appl. No.: 12/530,791

(22) PCT Filed: Mar. 3, 2008

(86) PCT No.: PCT/FR2008/000278
§ 371 (c)(1),
(2), (4) Date: Mar. 30, 2010

(87) PCT Pub. No.: WO2008/132303
PCT Pub. Date: Nov. 6, 2008

(65) Prior Publication Data
US 2010/0221572 A1 Sep. 2, 2010

(30) Foreign Application Priority Data

Mar. 14, 2007 (WO) ................ PCT/FR2007/000441

(51) Int. Cl.
*B32B 15/04* (2006.01)
*B32B 15/18* (2006.01)
*B32B 15/20* (2006.01)
*C22C 38/00* (2006.01)
*C22C 38/04* (2006.01)
*C22C 38/06* (2006.01)
*C22C 38/14* (2006.01)

(52) U.S. Cl.
USPC ............ 428/653; 428/659; 428/684; 148/320

(58) Field of Classification Search
USPC .......................................... 428/653, 659, 684
See application file for complete search history.

(56) References Cited

U.S. PATENT DOCUMENTS

| 6,537,394 | B1 | 3/2003 | Osawa et al. |
| 2001/0042393 | A1 | 11/2001 | Kefferstein et al. |
| 2003/0111144 | A1 | 6/2003 | Matsuoka et al. |
| 2008/0202639 | A1* | 8/2008 | Tomida et al. ................ 148/506 |

FOREIGN PATENT DOCUMENTS

| EP | 1 013 785 | 6/2000 |
| EP | 1 143 029 | 10/2001 |
| EP | 1 146 132 | 10/2001 |
| EP | 1 195 447 | 4/2002 |
| FR | 2 833 504 | 6/2003 |
| FR | 2 883 007 | 9/2006 |
| WO | 2006 097593 | 9/2006 |
| WO | WO 2007/015541 | * 2/2007 |

OTHER PUBLICATIONS

Machine Translation, Tomida et al., WO 2007/015541, Feb. 2007.*

* cited by examiner

*Primary Examiner* — Michael E La Villa
(74) *Attorney, Agent, or Firm* — Davidson, Davidson & Kappel, LLC

(57) ABSTRACT

The invention relates to a steel part, the composition of the steel of which comprises, the contents being expressed by weight: 0.040%≤C≤0.100%; 0.80%≤Mn≤2.00%; Si≤0.30%; S≤0.005%; P≤0.030%; 0.010% S≤Al≤0.070%; 0.015%≤Nb≤0.100%; 0.030% Ti≤0.080%; N≤0.009%; Cu≤0.100%; Ni≤0.100%; Cr≤0.100%; Mo≤0.100%; and Ca≤0.006%, the balance of the composition consisting of iron and inevitable impurities resulting from the smelting, the microstructure of the steel consisting of at least 75% equiaxed ferrite, martensite in an amount not less than 5% but not exceeding 20%, and bainite in an amount not exceeding 10%.

7 Claims, 1 Drawing Sheet

STEEL, FOR HOT FORMING OR QUENCHING IN A TOOL, HAVING IMPROVED DUCTILITY

CROSS REFERENCE TO RELATED APPLICATIONS

The present application is the national stage of international application PCT/FR2008/000278, filed on Mar. 3, 2008, and claims the benefit of the filing date of PCT/FR2007/000441, filed on Mar. 14, 2007.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable.

BACKGROUND OF THE INVENTION

1. Field of the Invention

The invention relates to the manufacture of hot-rolled or cold-rolled steel parts having, after hot-forming or quenching in a tool, particularly favorable and homogeneous strength, elongation and corrosion-resistance properties.

For some applications, the aim is to produce steel parts that combine high tensile strength, high impact resistance and good corrosion resistance. This type of combination is particularly desirable in the automobile industry in which significant lightening of vehicles is sought. This may in particular be obtained thanks to the use of steel parts having high mechanical properties, the microstructure of which is martensitic or bainitic-martensitic: anti-intrusion parts, structural parts or parts contributing to the safety of motor vehicles, such as fender cross-members and door or center pillar reinforcements for example, require the above properties.

2. Description of the Related Art

Thus, patent FR 2 780 984 discloses an aluminum-coated steel sheet having very high-strength after heat treatment, this treatment comprising heating between Ac3 and 1200° C. followed by hot-forming within a tool. The elements of the composition of the steel are the following: C: 0.15-0.5%; Mn: 0.5-3%; Si: 0.1-0.5%; Cr: 0.01-1%, Ti:<0.2%; Al, P:<0.1%; S:<0.05%; B: 0.0005-0.08%. The alloyed compound formed by interdiffusion between the precoating and the steel during the heat treatment provides protection against decarburation and corrosion.

In one embodiment, the use of a steel comprising 0.231% C, 1.145% Mn, 0.239% Si, 0.043% Al, 0.020% P, 0.0038% S, 0.179% Cr, 0.009% Cu, 0.020% Ni, 0.032% Ti, 0.0042% N, 0.0051% Ca and 0.0028% B makes it possible to obtain, after hot-forming, a strength greater than 1500 MPa associated with a completely martensitic structure.

The downside of this very high-strength level is the elongation at break, which is relatively low after heat treatment, around 5%. However, certain applications do not need such a high-strength level, but on the other hand they require an elongation at break capability in excess of 15%. These applications also require good corrosion protection of the parts.

These structural applications relate to reinforcing parts with a thickness between 0.5 and 4 mm approximately. What is sought is a steel having a strength and an elongation at break, after heat treatment of the parts, greater than 500 MPa and 15% respectively. The combination of these mechanical properties ensures, in the event of an impact, high energy absorption. These strength and elongation requirements must be satisfied even if the cooling rates within a tool may differ between parts 0.5 mm in thickness and those about 4 mm in thickness. This situation for example would allow the adjustments of an industrial line comprising both heating and cooling not to be changed when parts of different thickness, within the above thickness range, are treated in succession on the line.

Moreover, it is known that the hot-stamping of a part or its quenching between tools may result in local deformation of relatively large magnitude in certain regions. The contact between the part and the tool may be more perfect, or less perfect, to such an extent that the cooling rate may not be the same at every point. These local variations in terms of degree of deformation or of cooling rate may have the consequences that, after heat treatment, the part has a heterogeneous structure and non-uniform properties.

BREIF SUMMARY OF THE INVENTION

The object of the present invention is to solve the above-mentioned problems. In particular, the object of the invention is to provide hot-rolled or cold-rolled steel parts having, after hot forming or quenching in a tool, both a strength greater than 500 MPa and an elongation at break greater than 15%, for a thickness range going from approximately 0.5 to 4 mm. Another object of the invention is to provide parts with excellent structural homogeneity and uniform mechanical properties, that is to say those in which the strength and elongation do not vary in the various portions of the parts, even if the local degree of deformation or local cooling rate is not uniform therein during manufacture.

Another object of the invention is to provide steel parts that can be easily welded by the usual assembly processes (resistance welding, arc welding, laser welding), it being possible for the parts to be welded either before or after being hot-formed or quenched in a tool.

DETAILED DESCRIPTION OF THE INVENTION

Figure 1:
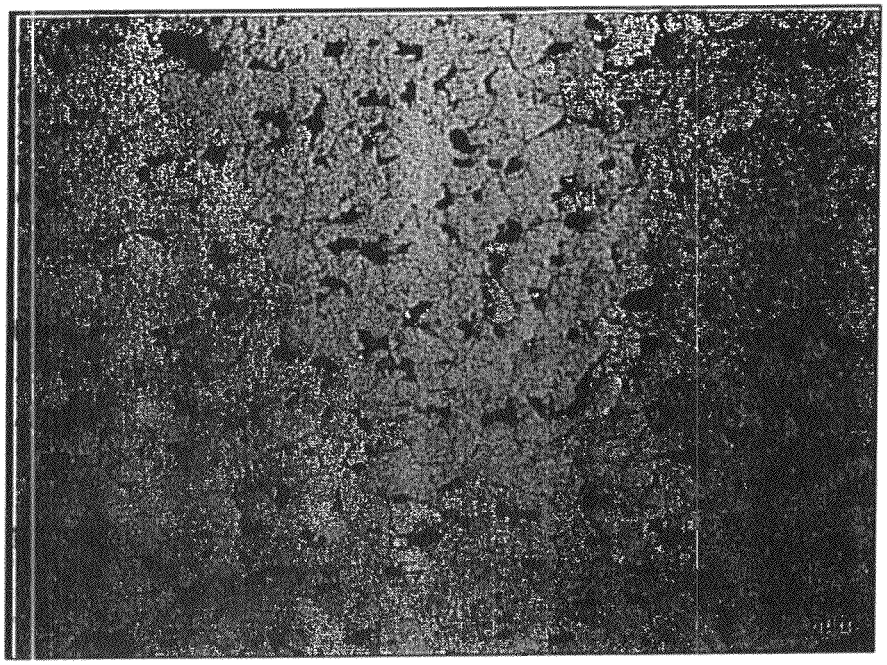
FIG. 1 shows the microstructure of a steel according to the invention, after heat treatment.

For this purpose, one subject of the invention is a steel part, the composition of the steel of which comprises, the contents being expressed by weight: 0.040%≤C≤0.100%; 0.80%≤Mn≤2.00%; Si≤0.30%; S≤0.005%; P≤0.030%; 0.010%≤Al≤0.070%; 0.015%≤Nb≤0.100%; 0.030%≤Ti≤0.080%; N≤0.009%; Cu≤0.100%; Ni≤0.100%; Cr≤0.100%; Mo≤0.100%; and Ca≤0.006%, the balance of the composition consisting of iron and inevitable impurities resulting from the smelting, the microstructure of the steel consisting of at least 75% equiaxed ferrite, martensite in an amount not less than 5% but not exceeding 20%, and bainite in an amount not exceeding 10%.

Another subject of the invention is a steel part according to the features given above, which is characterized in that the composition of the steel comprises, the contents being expressed by weight: $0.050\% \leq C \leq 0.080\%$; $1.20\% \leq Mn \leq 1.70\%$; $Si \leq 0.070\%$; $S \leq 0.004\%$; $P \leq 0.020\%$; $0.020\% \leq Al \leq 0.040\%$; $0.030\% \leq Nb \leq 0.070\%$; $0.060\% \leq Ti \leq 0.080\%$; $N \leq 0.009\%$; $Cu \leq 0.100\%$; $Ni \leq 0.100\%$; $Cr \leq 0.100\%$; $Mo \leq 0.100\%$; $Ca \leq 0.005\%$, the balance of the composition consisting of iron and inevitable impurities resulting from the smelting.

According to one particular embodiment, the mean ferrite grain size of the steel of the part is less than 6 microns.

According to one particular embodiment, the steel part is coated with a layer alloyed over the entire thickness of this layer. This alloyed layer results from at least one heat treatment for alloying between the steel and a precoating, the latter being an alloy based on zinc or aluminum.

According to a preferred embodiment, the strength of the steel part is greater than or equal to 500 MPa and its elongation at break is greater than 15%.

Another subject of the invention is a welded article, at least one of the portions of which is a part according to any of the above characteristics.

Another subject of the invention is a process for manufacturing a coated steel part, comprising the steps in which a hot-rolled or cold-rolled steel sheet with a composition as above is supplied; then a precoating is applied to the sheet, the precoating being an alloy based on zinc or aluminum. The sheet is cut so as to obtain a blank; then optionally, this blank is welded. Optionally, the blank is cold-deformed; then it is heated to a temperature $T_c$ in a furnace so as to form, by alloying between the steel and the precoating, an alloyed layer on the surface of the blank, the alloying being produced over the entire thickness of the layer, and so as to give the steel an entirely austenitic structure. The blank is removed from the furnace; then optionally, the blank is hot-deformed so as to obtain a part that is cooled under conditions suitable for giving the latter the intended mechanical properties.

Another subject of the invention is a process for manufacturing a part, comprising the steps in which: a hot-rolled or cold-rolled steel sheet with a composition as claimed in the above claim is supplied; then the sheet is cut so as to obtain a blank. Optionally, the blank is welded; then optionally, this blank is cold-deformed. The latter is heated to a temperature $T_c$ in a furnace so as to give the steel a completely austenitic structure; then the blank is removed from the furnace. Optionally, said blank is hot-deformed so as to obtain a part; then this part is cooled under conditions suitable for giving the latter the intended mechanical properties; and then optionally, a coating is applied to the part.

According to one particular method, the temperature $T_c$ is between 880 and 950° C., and the soak time $t_c$ at this temperature is between 3 and 10 minutes.

According to one particular method, the average cooling rate $V_c$ between the temperature $T_c$ and 400° C. is between 30 and 80° C/s.

Preferably, the average cooling rate $V_c$ between the temperature $T_c$ and 400° C. is between 35 and 60° C/s.

Yet another subject of the invention is the use of a part or article mentioned above, or manufactured according to one of the processes described above, for the manufacture of structural or safety parts for a land motor vehicle or for the agricultural machinery or shipbuilding field.

Other features and advantages of the invention will become apparent in the course of the description given below by way of example and with reference to the appended figures.

As regards the chemical composition of the steel, carbon plays an important role in the hardenability and the tensile strength obtained after the cooling that follows the austenitization treatment. Below a content of 0.040% by weight, it is not possible to obtain a strength above 500 MPa under any cooling conditions. Above a content of 0.100%, there is a risk of forming too large a proportion of martensite under the most rapid cooling conditions, for example when the parts are held within cooled tool. The elongation at break may then be less than 15%. A carbon content of between 0.050 and 0.080% makes it possible, depending on the manufacturing conditions, for the strength and elongation properties to be very stable and for the steel to exhibit very good weldability in the usual assembly processes.

Apart from its deoxidizing role, manganese also has an important effect on hardenability, in particular when its content by weight is at least 0.80%. Above 2.00%, its austenite-forming character leads however to the formation of too pronounced a banded structure. A 1.20-1.70% Mn range is preferred so as to obtain satisfactory hardenability without risk of segregation. In addition, very good toughness is thus obtained under static or dynamic mechanical stressing conditions.

Silicon helps to deoxidize the liquid steel and contributes to the hardening of the steel. Its content however must be limited so as to avoid excess formation of surface oxides and to promote coatability and weldability. An addition of more than 0.30% by weight of silicon would result in possible stabilization of the austenite after cooling in the tool, something which is not desired here. A silicon content below 0.070% is preferred in order to obtain the above results.

When in excessive amounts, sulfur and phosphorus reduce the ductility. This is why their content is limited to 0.005% and 0.030% by weight respectively. A content below 0.004% and 0.020% respectively makes it possible to increase more particularly the ductility and the toughness.

When in an amount between 0.010 and 0.070% by weight, aluminum enables the liquid steel to be deoxidized. An amount of preferably between 0.020 and 0.040% prevents any stabilization of the austenite.

Titanium and niobium belong to the category of microalloying elements, these elements being effective even in small quantities ranging from a few $10^{-3}$ to a few $10^{-2}\%$:

when the niobium content of the steel is between 0.015 and 0.100%, fine hardening carbonitrides Nb(CN) precipitates form in the austenite or in the ferrite during hot rolling. These precipitates also make it possible to limit austenitic grain growth during subsequent welding. A niobium content between 0.030 and 0.070% provides appreciable hardening while still moderately improving the mechanical properties at high temperature, thereby making it possible to limit the forces during hot rolling in the strip mills;

when the titanium content is between 0.030 and 0.080% by weight, precipitation at very high temperature occurs in the form of TiN nitrides and then, at lower temperature, in the austenite in the form of fine TiC carbides, resulting in hardening. The TiN precipitates effectively limit austenitic grain growth during any welding operations. A titanium content between 0.060% and 0.080% results in more intense precipitation of TiC or titanium carbosulfides; and the nitrogen content is less than 0.009% so as to prevent precipitation of TiN that would occur right from solidification in coarse form.

After hot rolling or cold rolling and annealing, the niobium and titanium are in precipitated form. In the process according to the invention, complete austenitization of the steel is then carried out, followed by quenching within a tool. The inventors have demonstrated that the precipitates, particularly titanium precipitates, are effective at retarding austenitic grain growth from heating and limit the formation of very hard secondary constituents that reduce the ductility. This control of the austenitic grain size makes it possible to achieve a low sensitivity to the variation in cooling rate.

The composition of the steel may also contain elements such as copper, chromium, nickel and molybdenum, which help to increase the strength through solid-solution hardening, or by their influence on hardenability. However, their individual contents must be limited to 0.1%, or otherwise bainitic structures form after in-furnace austenitization, these structures being sensitive to a variation in cooling rate.

The steel may also contain an addition of calcium, ranging up to 0.006%, and preferably 0.005%, for the purpose of spheroidizing the sulfides and improving the fatigue resistance.

The manufacturing process according to the invention is as follows:
   a sheet, or a blank cut from a sheet, of one of the above compositions is supplied. The initial microstructure of this sheet plays a relatively minor role insofar as complete austenitization takes place subsequently. However, the microalloying elements must be in precipitated form: for example, sheets or blanks may be manufactured by casting liquid steel followed by reheating to 1100° C. Hot rolling will be carried out with an end-of-rolling temperature below 940° C. The sheet will then be cooled down to 500-700° C. at a rate between 20 and 100° C/s. After subsequent air cooling, the sheet will then be coiled at a temperature between 450 and 680° C. These conditions make it possible to obtain fine dispersed precipitation of the microalloying elements.

The invention may be carried out on a sheet or blank, whether they be bare or precoated. In the latter case, a precoating is applied to the sheet, the precoating being an alloy, based on zinc or aluminum. In particular, this precoating may be applied by a hot-dip process, by electrodeposition or by a vacuum deposition process. The deposition may be carried out in a single step or through a combination of successive steps. The deposition is preferably carried out continuously. The thickness of this precoating may be between 5 and 35 microns, for the purpose of obtaining a coating resistant to the processing conditions.

The alloy of the precoating may be aluminum or an aluminum-based alloy. For example, the precoating may be applied by hot-dip coating in an aluminum-based bath that furthermore contains 8 to 11% silicon and 2 to 4% iron by weight.

The alloy of the precoating may also be zinc or a zinc-based alloy. This zinc alloy may also contain aluminum, for example in an amount ranging up to 5% by weight. The zinc-based alloy may also optionally contain one or more elements such as silicon, lead, antimony, bismuth, lanthanum and cerium.

The precoated sheet is then cut so as to obtain a blank having a geometry in accordance with that of the final portion to be obtained.

According to a variant of the invention, the precoated blank may optionally be welded to other steel parts. Indeed, it is known that certain applications do not require the same level of mechanical properties at all points in the parts. Thus, there has been a development in the use of tailor-welded blanks, which are assemblies made from steel sheets possibly having different compositions or different thicknesses. The precoated blank according to the invention may thus be incorporated by welding into a more complex assembly. The welding may be carried out by a continuous process, for example laser beam welding and electric arc welding, or by a discontinuous process such as, for example, spot resistance welding. The blank may be assembled with one or more other steel blanks, the composition and the thickness of which may be identical or different, so as to obtain in the final stage parts whose mechanical properties, after forming and heat treatment, vary within them and are adapted locally to the subsequent stresses. Apart from iron and the inevitable impurities, the composition by weight of the steel blanks assembled with the blank according to the invention will for example comprise 0.040-0.25% C; 0.8-2% Mn; ≤0.4% Si; ≤0.1% Al.

According to another variant of the invention, the precoated blank may optionally be cold-deformed. This deformation may be carried out such that the geometry is relatively close to the final geometry of the portion that it is desired to obtain. In the case of deformation carried out cold, this may be supplemented with deformation carried out hot, as will be explained later. If the cold deformation results practically in the final geometry, the part is then heated, before subjecting it to a conforming step within a tool. The purpose of this last step is to prevent any deformation of the parts upon cooling and to provide a particular cooling cycle thanks to appropriate contact between the part and the tool. This conformation step is therefore characterized by a minimal force applied by the tool on the part.

After these optional welding and cold-deformation steps, the blank is heated in a heat treatment furnace. The purpose of this treatment is to carry out a complete austenitization of the steel. If the blank is precoated, this treatment also has the purpose of forming a coating capable of protecting its surface during the treatment and during subsequent use of the part.

The role of the aluminum-based or zinc-based precoating is the following: during heating in a furnace, an alloying reaction between the steel substrate and the precoating occurs and an alloyed layer forms on the surface of the blank. The alloying takes place over the entire thickness of the precoating. Depending on the composition of the precoating, one or more intermetallic phases are formed in this alloyed layer. Since the melting point of these phases is above the temperature to which the part is heated, the coating does not melt at high temperature. The term "precoating" is understood to mean the alloy before heating and the term "coating" is understood to mean the alloyed layer formed during heating. The heat treatment therefore modifies the nature of the precoating and its geometry, since the thickness of the coating is greater than that of the precoating because of diffusion reactions to the steel substrate. As mentioned, the heat treatment forms a temperature-resistant layer. This layer protects the substrate by preventing it from coming into contact with the atmosphere of the furnace. Consequently, the decarburation and oxidation problems that would occur if the heating were carried out on a part without a precoating are avoided. The coatings formed also have the advantage of being adherent and of being suitable for the subsequent hot-forming operations that will follow.

The heating is carried out at a temperature $T_c$ above Ac3, the latter temperature denoting the end of austenitic transformation temperature of the steel during heating. The temperature $T_c$ is preferably between 880 and 950° C. A soak time $t_c$ for 3 to 10 minutes at $T_c$ may be carried out so as to homogenize the temperature of the blank. Under these conditions, a fine austenitic grain is formed within this temperature range slightly above Ac3. The hardenability is moderated from such a structure, thereby preventing the formation of microstructural constituents having a low ductility. A temperature variation within this range does not entail a large variability in the final mechanical properties.

The heated blank is then removed from the furnace and transferred to a tool where it either undergoes a hot deformation, for the purpose of obtaining the desired geometry of the part, or a simple conformation operation, as described above. Of course, if the blank has not been deformed beforehand, it is at the hot-deformation stage that the deformation will be entirely carried out. In both cases, the presence of the part in the tool results in cooling, which takes place essentially by thermal conduction. The cooling rate depends on parameters such as the transfer time between furnace and tool, the thickness and temperature of the part, any cooling of the tool itself by a coolant, and how long the part is held in the tool. According to a variant, the part may be transferred to another tool, called "secondary" tool, which allows the end of the cooling cycle to be controlled.

The inventors have demonstrated that achieving the desired mechanical properties is dependent on controlling a particular parameter, namely $V_c$: this parameter denotes the average cooling rate between temperature $T_c$ of the part on leaving the furnace and the temperature of 400° C. This temperature range between $T_c$ and 400° C. covers a particular interval in which the allotropic transformations resulting in the desired microstructures of the steel compositions according to the invention take place.

The rate $V_c$ is between 30 and 80° C/s: when $V_c$ is below 30° C/s, the structure of the parts is very predominantly ferritic and a strength level greater than 500 MPa cannot always be achieved. When the rate $V_c$ is between 35 and 60° C/s, the variability in the mechanical properties obtained is particularly small.

When the rate is greater than 80° C/s, an excessive amount of bainite is found within the microstructure: the properties of this constituent are sensitive to a slight variation in $V_c$. Consequently, a local variation in contact conditions between part and tool, or an inadvertent variation in the processing conditions relative to the nominal parameters, will result in a variability in the mechanical properties, either within a given part or from one part to another.

The microstructure according to the invention consists of at least 75% fine equiaxed ferrite, this percentage content corresponding to the surface fraction that may for example be measured on a polished and etched section. The term "equiaxed" denotes a structure in which the average ratio of the greatest length of the ferrite grains to their shortest length does not exceed 1.2. Preferably, the average ferrite grain size is less than 6 microns so as to obtain both a high-strength and an elongation at break very much greater than 15%.

The structure also contains martensite, the surface fraction of which is between 5 and 20%. This constituent is in the form of islands dispersed within the ferrite matrix, the size of these islands generally being equal to or smaller than that of the ferrite grains. In this fine dispersed form, the presence of 5 to 20% martensite allows the tensile strength to be increased without too pronounced a reduction in ductility.

The structure may also contain bainite in an amount limited to 10%. This is because it has been shown that the presence of this constituent is not desirable for the manufacture of parts that have to exhibit great uniformity in mechanical properties.

The formed parts thus obtained may then be optionally assembled by welding them to other parts, of the same or different thickness or composition, so as to constitute for example a more complex structure.

If the initial sheet or blank has no precoating, the parts formed may of course be coated after heat treatment by a suitable coating operation if corrosion protection is required of them.

To give an example, the following embodiments illustrate other advantages conferred by the invention.

EXAMPLE 1

Hot-rolled or cold-rolled steel sheets with a thickness ranging from 1.2 to 2 mm, having the following composition by weight, were considered:

TABLE 1

Composition of the steel (in wt %):
(The underled values indicate characteristics outside the invention)

| Steel | C | Mn | Si | S | P | Al | Nb | Ti | N | Others |
|---|---|---|---|---|---|---|---|---|---|---|
| A | 0.059 | 1.646 | 0.022 | 0.004 | 0.016 | 0.024 | 0.048 | 0.067 | 0.005 | Cu: 0.009 Mo: 0.003 Ni: 0.016 Cr: 0.027 Ca: 0.003 |
| B | 0.063 | 1.677 | 0.018 | 0.003 | 0.018 | 0.030 | 0.050 | 0.071 | 0.005 | Cr: 0.023 |
| C | 0.125 | 1.444 | 0.384 | 0.002 | 0.020 | 0.030 | 0.003 | 0.011 | 0.005 | Cr: 0.189 |
| D | 0.057 | 0.626 | 0.074 | 0.008 | 0.018 | 0.030 | 0.066 | 0.001 | 0.005 | Cr: 0.021 |

Steels A and B are steels having the composition according to the invention. Steels C and D are control steels. The hot-rolled sheet of steel A had a thickness of 2 mm. Steel B was subjected to trials in the form of hot-rolled sheets 2 mm in thickness and cold-rolled and annealed sheets 1.5 and 1.2 mm in thickness.

Steels C and D are control steels, these being cold-rolled and annealed, with a thickness of 1.2 mm.

Sheets of these various steels were hot-dip precoated in a bath of a molten aluminum alloy containing 9.3% silicon and 2.8% iron, the balance consisting of aluminum and inevitable impurities. The thickness of the precoating was about 25 microns per face. The sheets were then cut in the form of blanks.

The blanks were then heated to a temperature $T_c$ for a soak time $t_c$ indicated in Table 2. Some of the steels were subjected to a number of different trial conditions, such as steel B under conditions identified by B1 to B3. The heating conditions all result in complete austenitic transformation of the steels. During this heating and soaking phase, the precoating was transformed into an alloyed layer over its entire thickness. This alloyed coating, having a high melting point and a high hardness, is very resistant to corrosion and prevents the underlying base steel from being oxidized and decarburized during and after the heating phase.

After austenitization, the blanks were removed from the furnace at the temperature $T_c$ and then hot-deformed. The average cooling rate $V_c$ was varied according to the conditions indicated in Table 2. The mechanical properties measured on the parts (yield strength $R_e$, tensile strength $R_m$ and elongation at break A) are also indicated in Table 2.

TABLE 2

Austenitization and cooling conditions:
Mechanical properties obtained
(the underlined values indicate properties outside the invention)

| Steel: condition | $T_c$ (° C.) | $t_c$ (min) | $V_c$ (° C./s) | $R_e$ (MPa) | $R_m$ (MPa) | $R_e/R_m$ | A(%) |
|---|---|---|---|---|---|---|---|
| A1 | 900 | 6 | 45 | 380 | 600 | 0.63 | 22 |
| A2 | 950 | 6 | 45 | 370 | 597 | 0.62 | 22 |
| B1 | 920 | 7 | 30 | 366 | 562 | 0.65 | 22.5 |
| B2 | 930 | 10 | 45 | 409 | 618 | 0.66 | 21.5 |
| B3 | 920 | 7 | 100 | 470 | 703 | 0.67 | 13 |
| C1 | 920 | 5 | 35 | 499 | 819 | 0.61 | 14.5 |
| C2 | 920 | 5 | 50 | 543 | 831 | 0.65 | 10 |
| C3 | 920 | 5 | 90 | 1069 | 1358 | 0.78 | 5.5 |
| D1 | 920 | 6 | 35 | 410 | 455 | 0.90 | 23.5 |

The microstructures obtained after heat treatment were examined on polished and etched sections. The average ferrite grain size was determined by image analysis.

The trials carried out on steel A indicate that the mechanical properties depend little on the austenitization temperature within the range of the process of the invention. Industrial production will therefore be barely sensitive to an unplanned modification of this parameter. An example of the microstructure is given in FIG. 1. The structure, relative to trial B1, is made up of 93% equiaxed ferrite, having an average size of 5 microns, and 7% martensite.

Trials A1, A2, B1 and B2 all result in structures consisting of more than 75% equiaxed ferrite, martensite in an amount between 5% and 20%, and less than 10% bainite.

Too high a cooling rate (100° C./s, trial B3) results in a martensite content slightly greater than 20%. The martensite is present in the form of islands that may exceed 5 microns in size. The elongation is then less than 15%.

Figure 2:
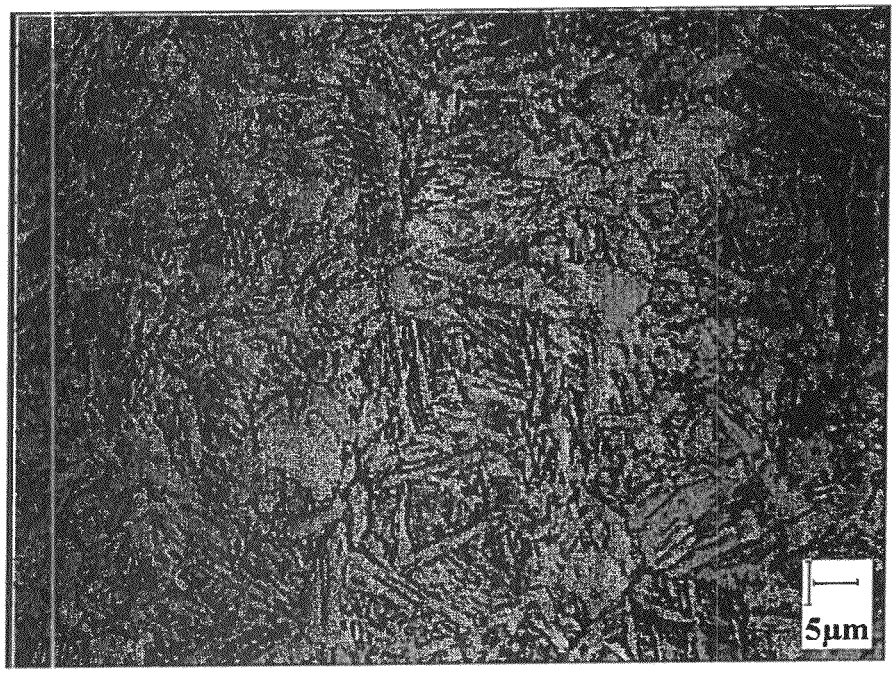
FIG. 2 shows the microstructure of steel not according to the invention, after a heat treatment.

Steel C has too high a carbon content and too high a silicon content, and does not contain enough microalloying elements for effective grain control. Even with 35° C./s cooling conditions, the structure is not ferritic, but predominantly bainitic as illustrated in FIG. 2 relating to trial C1. The elongation is then less than 15%. When the cooling rate increases (trials C2 and C3), the structure becomes predominantly martensitic, with traces of bainite. The elongation suffers an appreciable reduction.

Steel D has an insufficient content of manganese and titanium, and contains an excessive amount of sulfur. Consequently, the strength is insufficient, being less than 500 MPa under the condition of trial D1.

EXAMPLE 2

A sheet of steel B, with the composition according to the invention, detailed in Table 1, was considered. The sheet 2 mm in thickness was precoated with an aluminum-based alloy as explained in Example 1. The sheet was heated at 900° C. for 8 minutes and then hot-stamped so as to manufacture a part. The cooling rate $V_c$ was 60° C./s. Within the morphology of the part, the equivalent deformation ε varies according to the different regions: certain portions were practically undeformed locally (ε=0%) whereas others underwent a deformation of 20%. Micrographic observations, hardness measurements and tensile specimens were taken in these differently deformed regions. The yield strength varied between 430 and 475 MPa, the tensile strength between 580 and 650 MPa and the elongation at break between 17 and 22%. Thus, despite the fact that the austenitic grain is hot-deformed to a greater or lesser extent depending on the position in question, the steel and the process according to the invention are characterized by the fact that the properties remain very homogeneous within the same part. In particular, the tensile strength and the elongation at break remain greater than 500 MPa and 15%, respectively, whatever the degree of deformation in question.

The invention thus makes it possible to manufacture coated parts having high-strength and ductility properties, these properties being homogeneous in all the parts. The steels according to the invention are not very sensitive to a modification in the manufacturing parameters, this being an advantage in the event of an unscheduled delay on the manufacturing line, or in the event of a change of manufacture (for example parts of different thicknesses passing in succession into the same furnace).

These parts will be advantageously used to manufacture safety parts, and especially structural or reinforcing parts, for the construction of motor vehicles, and in the agricultural machinery or shipbuilding field.

The invention claimed is:

1. A steel part, manufactured by a process comprising:
(i) heating a steel blank;
(ii) forming the steel blank to obtain a formed blank; and
(iii) cooling the formed blank by holding the formed blank within a tool, thereby obtaining the steel part,
wherein the steel blank comprises a steel comprising, Fe and, by weight:

$0.040\% \leq C \leq 0.100\%$;

$0.80\% \leq Mn \leq 2.00\%$;

$Si \leq 0.30\%$;

$S \leq 0.005\%$;

$P \leq 0.030\%$;

$0.010\% \leq Al \leq 0.070\%$;

$0.015\% \leq Nb \leq 0.100\%$;

$0.030\% \leq Ti \leq 0.080\%$;

$N \leq 0.009$;

$Cu \leq 0.100\%$;

$Ni \leq 0.100\%$;

$Cr \leq 0.100\%$;

$Mo \leq 0.100\%$;

$Ca \leq 0.006\%$, wherein a microstructure of the steel of the part, after the cooling (iii), comprises at least 75% equiaxed ferrite, martensite in an amount not less than 5% but not exceeding 20%, and bainite in an amount not exceeding 10%, expressed as surface fractions.

2. The part of claim 1, the steel blank comprises, Fe and, by weight:

$0.050\% \leq C \leq 0.080\%$;

$1.20\% \leq Mn \leq 1.70\%$;

$Si \leq 0.070\%$;

$S \leq 0.004\%$;

$P \leq 0.020\%$;

$0.020\% \leq Al \leq 0.040\%$;

$0.030\% \leq Nb \leq 0.070\%$;

$0.060\% \leq Ti \leq 0.080\%$;

$N \leq 0.009\%$;

$Cu \leq 0.100\%$;

$Ni \leq 0.100\%$;

$Cr \leq 0.100\%$;

$Mo \leq 0.100\%$; and $Ca \leq 0.005\%$.

3. The part of claim 1, wherein a mean ferrite grain size of the steel of the steel part is less than 6 microns.

4. The part of claim 1, further comprising:
a coating comprising an alloyed layer, alloyed over an entire thickness of the alloyed layer,
wherein the alloyed layer is obtained by a process comprising heat treatment alloying the steel blank having a precoating thereon,
wherein the precoating comprises zinc or aluminum.

5. The part of claim 1, wherein a minimum tensile strength of the steel part at any portion thereof is greater than or equal to 500 MPa and an elongation of the steel part at any portion thereof at break is greater than 15%.

6. A welded article, comprising the part of claim 1.

7. The part of claim 1, having a thickness in a range of from 0.5 to 4 mm.

* * * * *